(No Model.)

W. HOLLAWAY.
SHAFTS FOR VEHICLES.

No. 426,726. Patented Apr. 29, 1890.

Witnesses:

Inventor

By his Attorneys,
Wm. Hollaway
C. A. Snow & Co.

UNITED STATES PATENT OFFICE.

WILLIAM HOLLAWAY, OF GILROY, CALIFORNIA.

SHAFT FOR VEHICLES.

SPECIFICATION forming part of Letters Patent No. 426,726, dated April 29, 1890.

Application filed August 9, 1889. Renewed March 20, 1890. Serial No. 344,676. (No model.)

*To all whom it may concern:*

Be it known that I, WILLIAM HOLLAWAY, a citizen of the United States, residing at Gilroy, in the county of Santa Clara, State of California, have invented new and useful Shafts or Thills, of which the following is a specification.

This invention has relation to shafts or thills of that class employed in two-wheeled vehicles, and among the objects in view is to overcome the horse motion of the vehicle, thus rendering the movement of the same similar to and as easy as a four-wheeled vehicle.

The invention consists in dividing the shafts near their rear ends into two sections and in connecting said sections by means of simple, easily-constructed, strong, and serviceable yielding connections.

Other objects and advantages of the invention will hereinafter appear, and the novel features thereof will be particularly pointed out in the claims.

Figure 1:
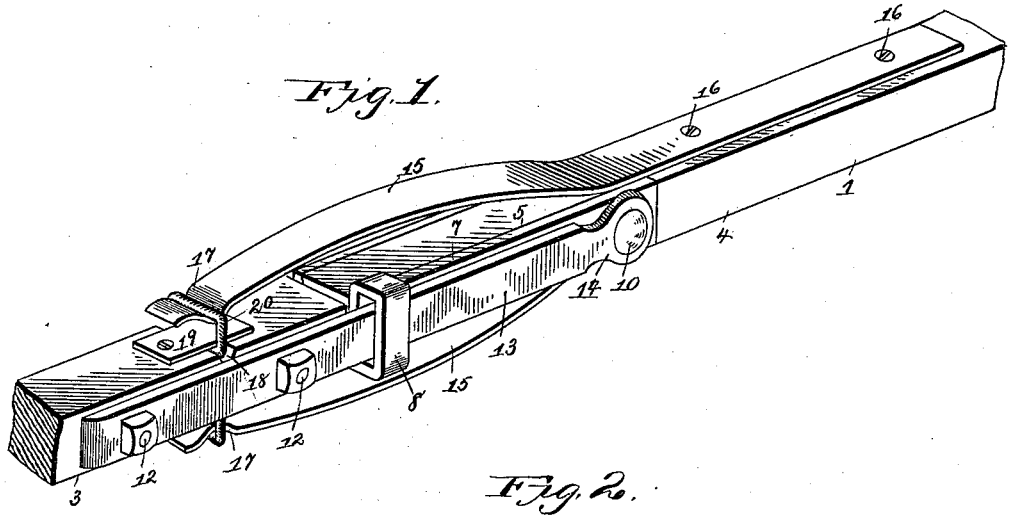
Figure 2:
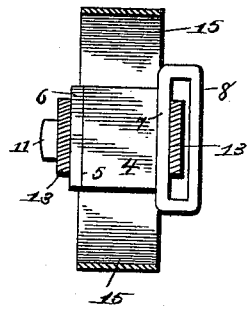
Figure 3:
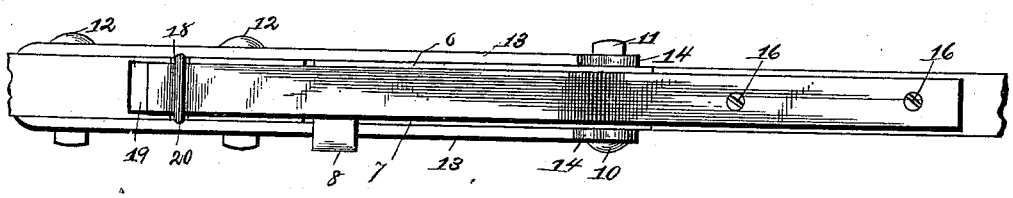

Referring to the drawings, Figure 1 is a perspective of a road cart-shaft constructed in accordance with my invention. Fig. 2 is a transverse section, and Fig. 3 a plan.

Like numerals of reference indicate like parts in all the figures of the drawings.

1 represents the shafts, the rear ends of which are preferably curved downwardly and connected in the usual manner to the axle of the vehicle, and are connected in front of the dash-board by the usual cross-bar. The shafts 1, preferably at a point slightly in front of the cross-bar, are transversely severed, forming sections 3 and 4, the ends of which are arranged a very short distance apart, merely enough to provide for the vertical oscillations of the same, as will hereinafter appear. The section 4 has its opposite sides for a portion of their length, near its abutting end, recessed, as at 5, and in said recesses are located wearing-plates 6 and 7. The wearing-plate 7 is provided at its outer end with a loop or band 8, and at its opposite end with a perforation, which also extends through the shaft or thill and the opposite plate 5, said latter plate having a plain outer end terminating at a point opposite its companion plate. A set-bolt 10 is inserted through the openings and provided with a nut 11. The width of the plates 6 and 7 is the same as the depth of the recesses 5, so that the outer surfaces of the two opposite side plates are flush with the sides of the two thill-sections.

Secured rigidly by means of bolts 12 to the opposite sides of the thill-section 3 are outwardly-projecting opposite straps 13, having at their outer ends eyes 14, through which the said bolt 10, mounted in the opposite thill-section, passes, whereby the thill-sections 4 are each pivoted to their companion sections 3, one of said straps being passed through the loop 8, formed on the bearing-plate 7, whereby the pivotal movement of the outer shaft-sections are limited.

From the upper and lower faces of the sections 4 there project rearwardly slightly curved spring-straps 15, the rear ends of which are secured to the thill-sections by screws or bolts 16, said spring-straps terminating beyond the point of severance of the thills and having formed near their terminals inwardly-disposed loops or bends 17. Transverse recesses 18 are formed in the upper and lower faces, respectively, of the section 3, and in the same are pivoted, by means of keepers 19, small loops or links 20, said loops being arranged at points opposite the bends 17 and adapted to receive the same.

If desired, I may omit either of the springs, as the two merely render the structure more efficient.

The operation of my invention will be at once apparent. The horse motion will be compensated for by the pivotal movement of the front thill-sections 4, leaving the rear thill-sections and body of the vehicle to move along in the usual manner of a four-wheeled vehicle. If by accident one or both of the spring-straps should break, it would still be impossible for a detachment or separation of the thills to take place, as the loop 8 would limit the downward movement of the rear end of the thill-section 4, and thus avoid any possibility of an accident from that source. The loop also serves to relieve the springs of any stress caused by the weight of the occupant being thrown upon the shaft in entering or leaving the vehicle.

Having thus described my invention, what I claim is—

1. The combination, with the two thill-sections pivotally connected at their adjacent ends, one of said sections being provided with opposite springs, the ends of which are connected to the opposite section, the tendency of said springs being to retain the sections in alignment, substantially as specified.

2. The combination of two thill-sections, one of which is provided with opposite straps having perforations connected to the adjacent thill-section at a point beyond its end by means of a pivotal bolt, and spring-straps connecting the sections and tending to maintain them in line with each other, substantially as specified.

3. The thills 1, divided into sections 3 and 4, the section 3 having the opposite rigid straps 13, terminating in eyes 14, and the set-bolt 10, passing through the eyes and the thill-section 4 and having the nut 11, substantially as specified.

4. The thill-section 4, recessed, as at 4, and having the opposite wearing-plates 6 and 7, each perforated as at 9, and the wearing-plate 7, having a loop 8, in combination with the straps 14, one of which is passed through the loop 8 and has eyes 14 registering with the opening 9, the bolt 10, inserted through the eyes and openings, and the opposite section 3, rigidly connected with the straps, substantially as specified.

5. The combination, with two thill-sections yieldingly connected, of opposite springs connected to the sections and means for limiting the movement of the springs, substantially as specified.

6. The section 4, having the springs 15, and having the wearing-plates 6 and 7 perforated, as at 9, and bolted pivotally, as at 10, to the shaft, one of said plates having the loop 8, in combination with the section 3, having the opposite rigidly-connected straps 13, terminating in eyes 14, for the reception of the bolt 10, one of said straps passing through the loop 8 and having the opposite recesses 18, the links 30, mounted in the recesses, and the keepers 19, mounted over the links, said links being connected with bends 17, in which the springs terminate, substantially as specified.

In testimony that I claim the foregoing as my own I have hereto affixed my signature in presence of two witnesses.

WILLIAM HOLLAWAY.

Witnesses:
RICHARD LASSA,
SILAS G. BABB.